United States Patent
Woodard et al.

[11] Patent Number: 6,111,698
[45] Date of Patent: Aug. 29, 2000

[54] MULTILAYER ABSORBING ANTIREFLECTIVE COATING

[75] Inventors: Floyd Eugene Woodard, Belmont, Calif.; Clark I. Bright, Tucson, Ariz.

[73] Assignee: Southwall Technologies, Inc., Palo Alto, Calif.

[21] Appl. No.: 09/262,602

[22] Filed: Mar. 4, 1999

Related U.S. Application Data

[60] Provisional application No. 60/077,051, Mar. 6, 1998.

[51] Int. Cl.⁷ .............................. G02B 1/11; G02B 5/28; G02B 5/23; B05D 5/06
[52] U.S. Cl. .................... 359/585; 359/588; 359/590; 427/164
[58] Field of Search ................... 359/585, 588, 359/589, 582, 580, 590; 427/164–168

[56] References Cited

U.S. PATENT DOCUMENTS

| | | | |
|---|---|---|---|
| 4,185,894 | 1/1980 | Hilton et al. | 350/338 |
| 4,786,783 | 11/1988 | Woodard | 219/547 |
| 4,846,551 | 7/1989 | Rancourt et al. | 350/166 |
| 4,960,310 | 10/1990 | Cushing | 350/1.7 |
| 5,091,244 | 2/1992 | Bjornard | 428/216 |
| 5,521,759 | 5/1996 | Dobrowolski et al. | 359/585 |
| 5,691,044 | 11/1997 | Oyama et al. | 428/216 |
| 5,744,277 | 4/1998 | Bright et al. | 428/216 |

*Primary Examiner*—Jon Henry
*Attorney, Agent, or Firm*—Law Offices of Terry McHugh

[57] ABSTRACT

A reflection control member includes a multilayer stack that is adhered to a substrate using a primer layer to promote adhesion. The multilayer stack includes pairs of layers in which the first layer is a grey metal and the second layer is a substantially transparent material. In the preferred embodiment, the grey metal is nickel chromium and the transparent layer is a silicon oxide. For each pair of layers, the grey metal is nearer to the surface of the substrate for which antireflection is a concern. The primer layer has a thickness of less than 50 angstroms. Although the primer layer is deposited in an essentially oxygen-free environment, it may oxidize following deposition.

16 Claims, 4 Drawing Sheets

MULTILAYER ABSORBING ANTIREFLECTIVE COATING

This application claims the benefit of U.S. Provisional Application No. 60/077,051, filed Mar. 6, 1998.

TECHNICAL FIELD

The invention relates generally to providing desired optical properties at a surface of a light transmissive or reflective member, and more particularly to providing an antireflective coating onto a surface of a light transparent member, such as a display screen.

BACKGROUND ART

Coatings are applied to light transmissive or reflective members in order to impart desired optical properties to the members. For example, one or more coatings may be applied to a screen of a computer monitor in order to provide polarization or to reduce reflection. One method for reducing light reflection from a substrate, such as a cathode ray tube (CRT), is to coat the surface with an antireflective layer having a thickness of approximately one-quarter wavelength of the light to be reflected. The antireflective layer may be an organic material, such as a polymer, or an inorganic material, such as a metal fluoride, where the deposited layer has a refractive index that is less than that of the CRT. A high reduction in reflection is achieved when the refractive index of the deposited antireflective layer equals the square root of the refractive index of the CRT material. This approach has limitations. Single layer, low refractive index antireflective coatings often exhibit distinct colorations, particularly regarding reflection.

Antireflective coatings having wider bandwidths, and consequently less coloration, may be obtained by using multiple deposited layers. Two common antireflective coating designs are the quarter-quarter (QQ) and the quarter-half-quarter (QHQ) stacks. That is, the antireflective coating is formed of a number of layers having differing refractive indices, each equal in optical thickness to one-quarter (Q) or one-half (H) of a wavelength sought to be antireflected.

A detailed description of an antireflection stack is contained in U.S. Pat. No. 5,744,227 to Bright et al., which is assigned to the assignee of the present invention. At least two pairs of layers are formed to provide the antireflection properties. One layer of each layer pair is an electrically conductive, light transmissive, inorganic material having an index of refraction in the range of 1.88 to 2.15, while the other layer is a light transmissive inorganic oxide having an index of refraction in the range of 1.4 to 1.6. The stack performs well for achieving the desired optical properties.

Antireflective coatings are typically fabricated with non-absorbing material. Consequently, the reduction in reflection is accomplished by increasing the energy that is transmitted into the member for which antireflection is a concern (e.g., the CRT). Some absorption along the light path may be beneficial to enhancing image contrast. To this end, absorbing materials may be added to the transparent material (glass) that is used in fabricating the CRT. Alternatively, the antireflective coating that protects the CRT may include one or more absorbing layers. The absorbing layers may have dispersion in n and k which leads to good antireflection properties (i.e., low reflection and wide bandwidth), with relatively few layers. See for example, U.S. Pat. No. 5,691,044 to Oyama et al., where titanium nitride ($TiN_x$) is shown to be a preferred absorbing layer. However, simple stacks involving only two layers (e.g., $TiN_x$ and $SiO_2$) generally provide good antireflection properties only for a narrow range of transmission values. The use of metal nitrides as absorbing layers is also taught in U.S. Pat. No. 5,091,244 to Bjornard. In some cases, nitrides are not the preferred materials for antireflective stacks, since the optical properties of the nitrides are often very dependent on the deposition conditions (e.g., the relative amount of $N_2$ and $O_2$ in one deposition environment). However, further improvements in optical characteristics are sought.

U.S. Pat. No. 4,846,551 to Rancourt et al. describes an optical filter assembly to enhance image contrast and reduce glare of a CRT. A number of layers are formed on a substrate to achieve the desired optical properties. The first layer is an aluminum oxide layer having a thickness of at least 170 nm, which is approximately ⅜ wave of optical thickness at a design wavelength of approximately 500 nm. In the preferred embodiment, atop the aluminum oxide layer are alternating layers of nickel and magnesium fluoride. The first nickel layer is formed on the aluminum oxide. The aluminum oxide is intended to enable the nickel layer to be securely joined to the substrate. The nickel layer has a thickness of about 13 to 80 angstroms. The next layer is a magnesium fluoride film having a thickness equivalent to a quarter wave optical thickness. A second nickel layer is formed to have a thickness in the order of 75 angstroms. Finally, a second magnesium fluoride layer has a quarter wave optical thickness. The patent notes that test measurements of this optical filter coating in use with a CRT evidence that only 0.5–0.8 percent of the integrated reflected light reached the eyes of a viewer of the display and that the integrated light transmittance of the image display was approximately 84 percent. In comparison, 10–12 percent of the reflected light reached the eyes of the viewer when the optical filter coating was not used.

While available optical coatings achieve acceptable results, what is needed is an antireflective coating that provides contrast enhancement and that is relatively easily process-tailored to achieve a visible light transmissivity (Tvis) within a wide range of values, while maintaining good antireflection properties. Furthermore, it is desired that absorbing layers be relatively simple to deposit, and thus result in high manufacturing productivity.

SUMMARY OF THE INVENTION

In a broad description of the structure of the invention, a multilayer absorbing antireflective coating comprises at least four alternating layers of a grey metal and a transparent material having a refractive index in the range of 1.25 to 1.7. In a four-layer stack, one of the grey metal layers is the layer that is nearest to the surface for which antireflection is a concern, but is bonded to the surface by a thin primer layer. Preferably, the primer layer has a thickness of less than 50 angstroms.

In a narrower description of the structure, the transparent material is preferably a silicon oxide ($SiO_x$), and more preferably silicon dioxide. The grey metal is preferably a nichrome alloy (NiCr), such as nichrome having a composition of 80/20. In addition to nichrome, acceptable grey metals include inconel, monel, stainless steel and chrome.

Another level of description of the invention relates to layer thicknesses. The thickness of the grey metal layer closest to the surface to be protected (e.g., a CRT screen) should be in the range of 0.5 nm to 30 nm, and more preferably in the range of 1 nm to 15 nm. The adjacent $SiO_x$ layer preferably has a thickness in the range of 50 nm to 200 nm, and more preferably in the range of 70 nm to 150 nm.

However, the thickness of this second layer is dependent upon the optical properties of the previous layer. A second grey metal layer has a thickness that is in the same range as the first grey metal layer, but in the preferred embodiment the thickness is tailored to achieve the desired Tvis value for the totality of the coating. This value is adjustable within the range of 20% to 80%, but is more preferably adjusted within the range of 30% to 60%. A second $SiO_x$ layer has a thickness in the range of 60 nm to 120 nm. The thickness of this second layer may be adjusted to vary the antireflection characteristics. For example, if the $SiO_x$ top layer is increased in thickness, the wavelength of the reflection minima (Rmin) of the antireflective stack will increase to higher wavelengths.

Optical and electrical properties of the layers provide another level of description. The Tvis for the stack is preferably in the range of 20% to 80%, and more preferably in the range of 30% to 60%. As previously noted, the Tvis value can be tailored by adjusting the thickness of one or both of the grey metal layers. No more than 10% of the absorption in the visible range (Avis) should occur within the $SiO_x$ layers, and more preferably, this value is less than 5%. Regarding the k/n value of the grey metal layers, the value preferably does not exceed 3. Regarding electrical properties, the grey metal layers preferably have a sheet resistivity that does not exceed 2000 ohms per square, while the other layers in the layer pairs are formed of a dielectric material, e.g., silicon dioxide.

The layer pairs may be formed on a flexible substrate, such as polyethylene terephthalate (PET), but other substrate materials can be used (e.g., PEN or PES). A hardcoat layer may be formed on the substrate. The hardcoat layer improves the durability of the flexible substrate during processing and during use of the end product. The hardcoat layer can be any one of known hardcoat materials, such as silica-based hardcoats, siloxane hardcoats, melamine hardcoats, acrylic hardcoats and the like. Such materials typically have refractive indices of 1.4 to 1.6.

The thin primer layer improves adhesion of the layer pairs to the hardcoat layer. The primer may be a material that undergoes conversion, i.e., oxidation, after being deposited, so as to yield a substantially transparent, substantially colorless inorganic material. For example, silicon may be used as the primer material, so that after a period of time a layer of silicon oxide is formed. The thickness of the hardcoat layer may be in the range of 0.5 μm to 20 μm, while the thickness of the primer layer is typically less than 50 angstroms. On a side of the layer pairs opposite to the substrate, a protective topcoat may be formed. The topcoat may be a combination of silane and a fluorocarbon. The silane functions as a bonding material for the fluorocarbon, which provides desired lubricating properties. An acceptable fluorocarbon for the lubricating material is sold by 3M Company under the federally registered trademark FLUORORAD. The topcoat is hydrophobic and oleophobic and has a low surface energy and high contact angle. Thus, the topcoat exhibits anti-smudge characteristics.

The invention can also be described with reference to a method of manufacture. While not critical, the layers may be deposited by using sputter deposition techniques. In a first pass through a sputter deposition apparatus, a mild preglow treatment prepares the surface of the substrate material to improve adhesion for application of the subsequently deposited layer. The material (e.g., silicon) that forms the primer layer is introduced at this initial pass. It is preferred that the primer layer be deposited in an environment as free of oxygen as possible. However, after the primer layer is applied, exposing the primer material to oxygen is acceptable. In a second pass, the preglow is again activated and the first layer pair is formed. The grey metal layer is nearest to the substrate. Depending upon process conditions, it may be necessary to introduce a third pass in order to increase the thickness of the upper layer (e.g., $SiO_x$) of the first pair. The thickness of this upper layer is dependent upon the optical characteristics of the first grey metal layer, as determined by the selection of the grey metal material and the thickness of the grey metal layer. It also depends on the desired transmission in the completed stack. In a next pass, the second layer pair is deposited. Subsequent passes are necessary if additional layer pairs are desired, with each pass depositing both layers of a layer pair. Optionally, the lubricating topcoat is then added.

An advantage of the invention is that the absorption provided by the antireflection stack may be used to significantly enhance the contrast at the image plane of a display device, such as a CRT. Merely by adjusting the thicknesses of the layers, the value of Tvis can be easily tailored to obtain the desired optical characteristics. Furthermore, by optimizing layer thicknesses, a low reflection can be achieved over a wide range of wavelengths (i.e., a wide bandwidth). Another advantage is that by using grey metals, the electrically conductive layers act as a shield to retard emissions that are emitted by a CRT. The end product has a high stability with regard to oxidation in a natural environment and is mechanically robust when deposited on an adequate hardcoat. The stable grey metal retains the original antireflection characteristics for a number of years.

DETAILED DESCRIPTION

Figure 1:
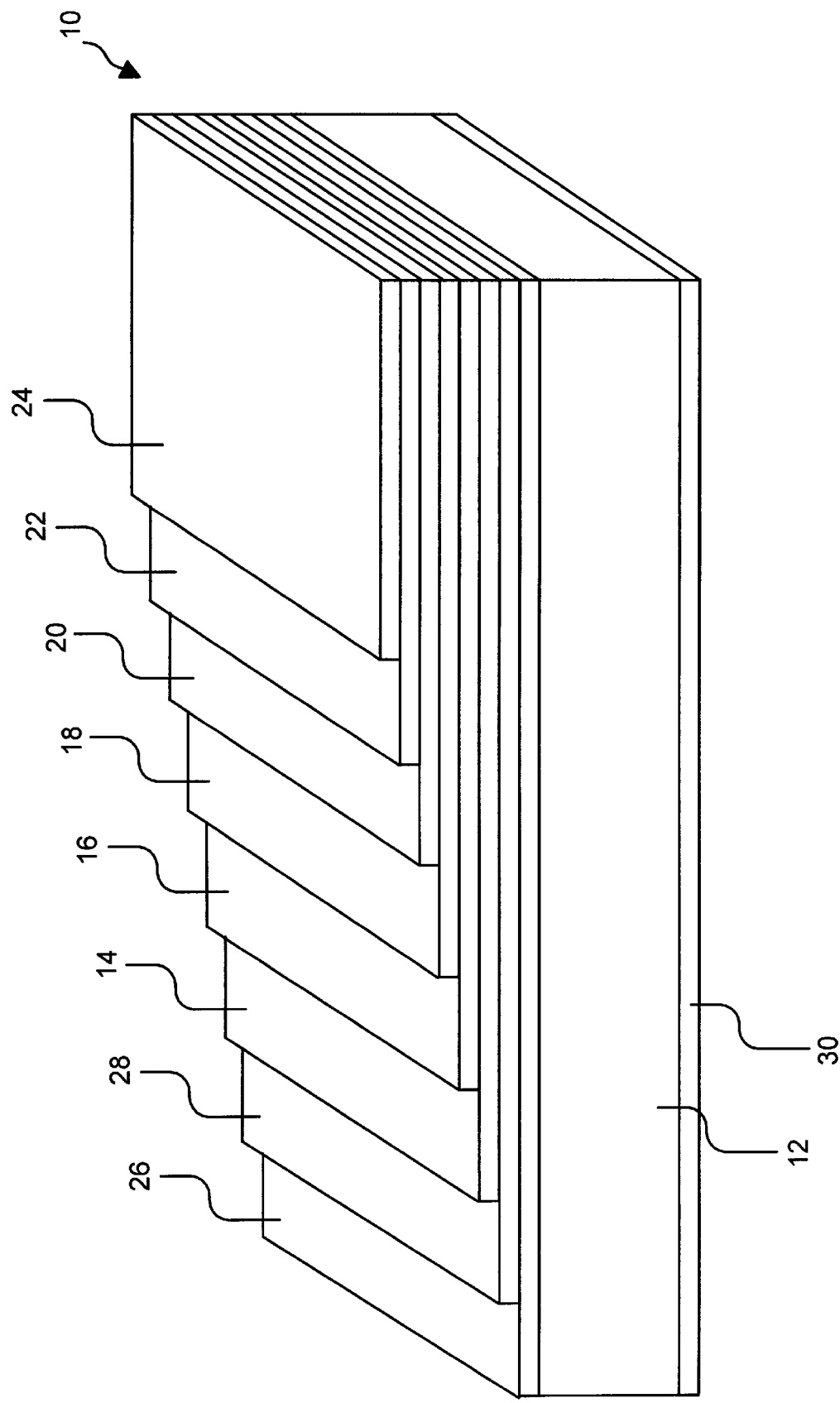
FIG. 1 is a perspective view of one embodiment of an absorbing antireflective coating in accordance with the invention.

With reference to FIG. 1, one embodiment of an optical arrangement 10 for forming a multilayer absorbing antireflective coating is shown as including a light transmissive substrate 12. The substrate may be formed of PET, but other materials may be used. The substrate material is not critical to the invention, but in the preferred embodiment, antireflection and topcoat layers that are described below are applied to a web form, so that the substrate should be flexible. The flexible substrate and the various layers can then be attached to another substrate, such as a CRT screen. On the other hand, the antireflection and topcoat layers may be applied directly to the final product. Thus, the substrate may be an organic or inorganic material.

In the absence of the absorbing antireflection stack formed by layers 14, 16, 18 and 20, the substrate 12 should exhibit a reflection level below 20% over the visible wavelengths. For example, PET reflects from 10% to 15% of visible light (two-sided reflection). The antireflection stack formed by the layers 14–20 is designed to significantly reduce the reflection level by absorption and by destructive interference of reflected light.

Atop the antireflection stack is an adhesion promotion layer 22, such as a silane layer, and a lubricating layer 24 of a fluorocarbon with a low surface energy and with antifriction properties to facilitate cleaning and scratch resistance. The lubricating layer 24 is preferably a material sold by 3M Company under the federally registered trademark FLUORORAD. The most preferred material is FLUORORAD FC-722, which is sold diluted by a 2% solution in a fluorinated solvent. However, neither layer 22 nor layer 24 is critical.

Between the antireflection layers 14–20 and the substrate 12 are a hardcoat layer 26 and a primer layer 28. The hardcoat layer improves the durability of the flexible substrate during processing and during use of the end product. Hardcoat layers are known in the art. The hardcoat layer 26 of FIG. 1 can be any one of known materials, such as silica-based hardcoats, siloxane hardcoats, melamine hardcoats, acrylic hardcoats and the like. Such materials typically have refractive indices of 1.40 to 1.60. Thus, the refractive indices are generally in the same range as the index of the substrate 12. An acceptable thickness range is from 1 $\mu$m to 20 $\mu$m.

The thin primer layer 28 promotes adhesion of the antireflection layers 14–20 to the hardcoat layer 26. The primer layer may be a metal or semiconductor that undergoes conversion, i.e., oxidation, after deposition, so as to yield substantially transparent, substantially colorless inorganic material, such as a metal or semiconductor oxide. Examples of useful primer materials include silicon, titanium, chromium and nickel. Alternatively, the primer layer may be deposited as a substoichiometric oxide, such as $CrO_x$, $SiO_x$, and the like. The primer layer 28 should be sufficiently thin to minimize disruption of the desired optical properties of the optical arrangement 10. Preferably, the primer layer has a thickness of less than 50 angstroms.

The layers 14 and 16 form a first layer pair, while the layers 18 and 20 form a second layer pair. Each layer pair has a lower absorbing grey metal layer 14 and 18 and an upper transparent layer 16 and 20. The upper transparent layers are formed of a material having an index of refraction in the range of 1.25 to 1.7. A preferred material is $SiO_x$, with the most preferred material being silicon dioxide. The first and third antireflection layers 14 and 18 are "high index layers" relative to the second and fourth antireflection layers 16 and 20.

Preferably, the grey metal layers 14 and 18 each have a substantial degree of electrical conductivity. For example, the sheet resistivity is preferably below $1\times10^6$ ohms per square, and more preferably is less than 2000 ohms per square. In the preferred embodiment, the grey metal is a nichrome alloy, such as nichrome having a composition of 80/20. However, other acceptable grey metals include inconel, monel, stainless steel and chrome. The thickness of the lower grey metal layer 14 should be in the range of 0.5 nm to 30 nm, and more preferably in the range of 1 nm to 15 nm. The adjacent $SiO_x$ layer 16 preferably has a thickness in the range of 50 nm to 200 nm, and more preferably in the range of 70 nm to 150 nm. However, the thickness of this layer 16 is dependent upon the optical properties of the grey metal layer 14 within the first layer pair comprised of layers 14 and 16.

The second grey metal layer 18 has a thickness that is in the same range as the first grey metal layer 14, but in the preferred embodiment the thickness is tailored to achieve the desired Tvis value for the totality of the optical arrangement 10. By varying the thicknesses of the layers 14–20, this Tvis value is adjustable within the range of 20% to 80%, but is more preferably adjustable within the range of 30% to 60%. The $SiO_2$ layer 20 of the second layer pair has a thickness in the range of 60 nm to 120 nm. The thickness of this second layer may be adjusted to vary the antireflection characteristics of the optical arrangement 10. For example, if the $SiO_x$ top layer 20 is increased in thickness, the wavelength of the reflection minima (Rmin) of the optical arrangement 10 will shift to higher wavelengths. Thus, the range of wavelengths to be antireflected is adjustable.

The second and fourth antireflection layers 16 and 20 are preferably $SiO_x$, but this is not critical. The two layers 16 and 20 each have a refractive index in the range of 1.25 to 1.7, and more preferably in the range of 1.4 to 1.6. These layers may be referred to as "low index layers" of the layer pairs that provide the absorbing antireflection capability. Each of the layers is substantially transparent and substantially colorless when present in combination with its high index layer of the pair. The layers should not have an Avis that exceeds 10%, and more preferably less than 5%. Examples of the materials that provide suitable characteristics for forming the low index layers are certain inorganic oxides, metal fluorides and metal oxyfluorides. For sputtering, the preferred material is silicon dioxide.

Figure 2:
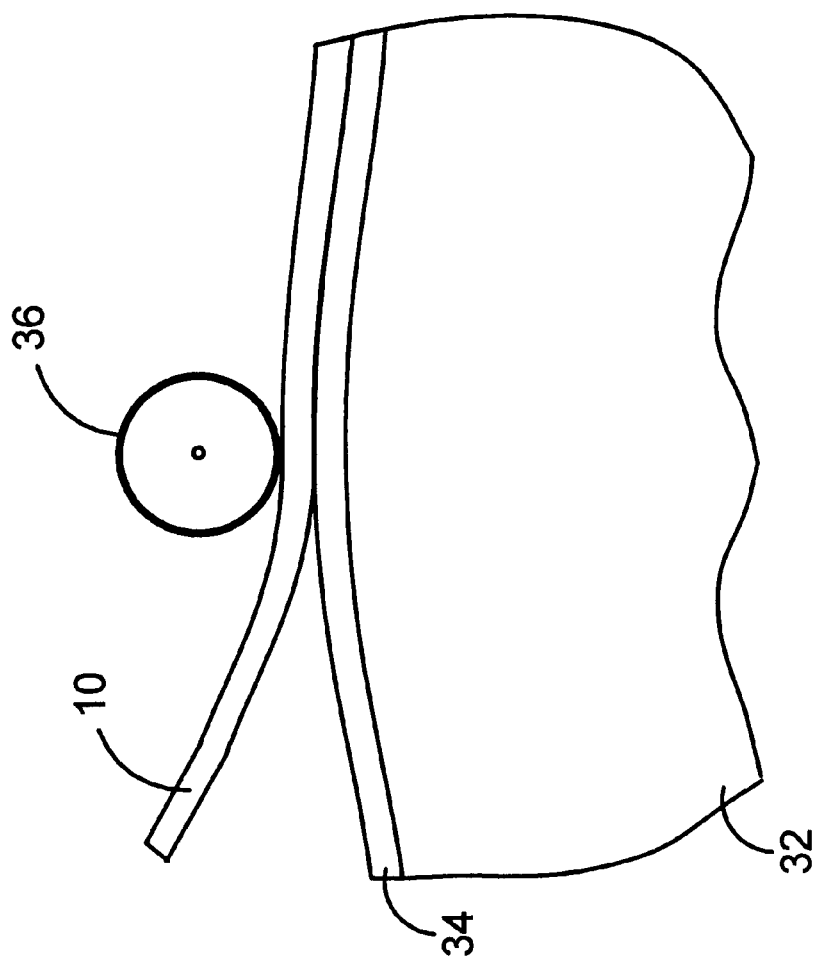
FIG. 2 is a schematic view of one embodiment for applying the absorbing antireflective coating of FIG. 1 to an optical device, such as a display screen.

On the underside of the substrate 12 is an optional pressure-sensitive adhesion primer 30 that is used in attaching the optical arrangement 10 to another surface. Alternatively, the substrate may be attached to the surface by electrostatic force. Referring now to FIG. 2, the optical arrangement 10 may be delivered in roll form at pre-slit widths. A sheet of the roll is shown as being laminated to a CRT 32. Optionally, an ultraviolet-curable adhesive film 34 may be formed on the CRT. A roller 36 is used to apply the required load force to attach the optical arrangement 10 to the CRT. Because of the singular radius of curvature of certain CRTs, direct lamination of the arrangement is easily accomplished. If the CRT is one that includes compound radii of curvature, the optical arrangement may be thermoformed prior to lamination. Thermoforming techniques are known in the art.

It should be noted that the grey metals are deposited in a manner designed to minimize the amount of oxygen incorporated into the coating. Nevertheless, due to background gases, water in the substrate, etc., some slight degree of oxidation often occurs. However, the atomic ratio of metal-to-oxygen in the grey metal should be less than 0.3, and more preferably less than 0.2.

The optical arrangement 10 of FIG. 1 may be fabricated using sputtering. An advantage of this optical arrangement is that absorbing layers (i.e., the grey metal layers 14 and 18) do not require the use of a reactive sputtering deposition process, as is required for nitride absorbing layers. Thus, the coating stack deposition rate is optimized.

Typically, the primer layer 28 is formed following a mild preglow treatment of the surface area of the hardcoated substrate on which the primer layer material is formed. The preglow is an ionized gas cleaning that conditions the surface to improve adhesion for the subsequently deposited layer. The preglow and the primer layer deposition may occur simultaneously in an initial pass of a web of hardcoated substrate material through a sputter deposition apparatus. In sputtering, a voltage is applied to a metal, a semiconductor, or a metal compound sputtering cathode in the presence of a reactive or non-reactive gas to create a plasma. The action of the sputtering gas plasma on the cathode causes atoms of the cathode target to be dislodged and to travel for deposition onto a substrate positioned adjacent to the sputtering source. Typically, the sputtering gas is a noble gas, such as krypton or argon or the like. Argon is the most common sputtering gas, because of its attractive cost. It is also known in the art to employ approximately 1% to approximately 90% (or even 100% in the case of a titanium target) of one or more reactive gasses as components of a sputtering gas mixture. When a reactive gas is present, it causes a metal or semiconductor to be deposited as an oxide (when an oxygen source is present), an oxynitride (when an oxygen and nitrogen source is present), or another material that is dependent upon the presence of an appropriate gas.

Figure 3:
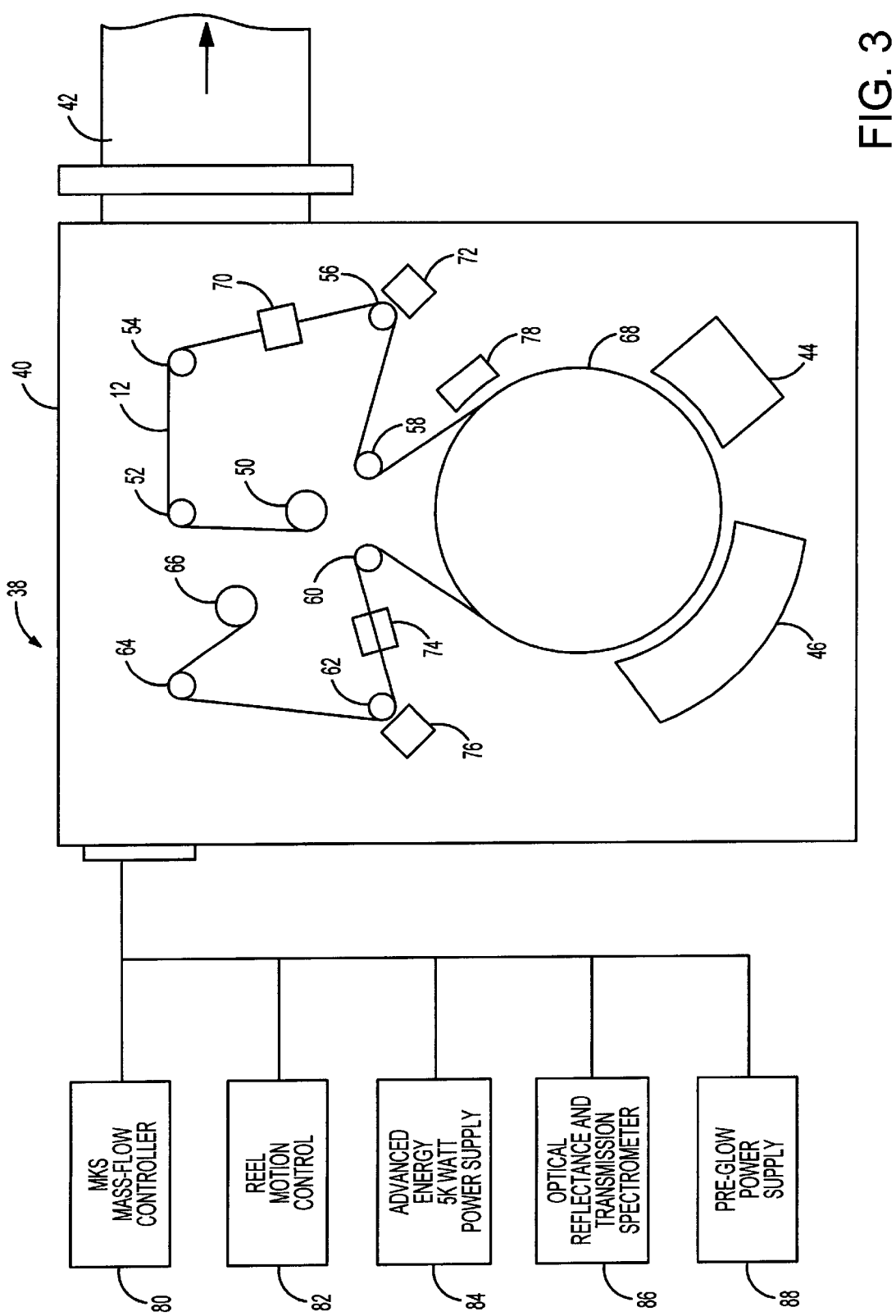
FIG. 3 is a schematic view of a sputtering apparatus for forming the optical arrangement of FIG. 1.

FIG. 3 shows a continuous web coating sputtering apparatus 38. The web coating system includes a vacuum chamber 40 that is evacuated via a line 42. Contained within the chamber is a drive mechanism for moving a sheet of flexible substrate 12 past a series of magnetron sputtering stations 44, 46 and 48. The components for driving the web include a feed roller 50, idlers 52, 54, 56, 58, 60, 62 and 64 and a take-up roller 66. The substrates passes around a chilled idler drum 68.

A pair of monitors 70 and 72 may be used to determine the optical properties of the web prior to the application of coatings, while monitors 74 and 76 determine the optical properties following the application of coatings. Optical properties of concern include transmittance, reflectance and absorbency.

The sputtering apparatus 38 is configured so as to be able to simultaneously and serially sputter deposit up to two layers on the web 12, using two separate magnetron cathodes at the two separate stations 44 and 46. The cathodes at station 46 is typically AC powered, while the cathodes at station 44 are typically DC powered.

As the web material 12 is rotated about the axis of the drum 68, the substrate first encounters a preglow station 78 that provides the surface modification described above. The first station 44 lays down the primer layer 28 of FIG. 1. Often in a second pass, station 44 is used to deposit the grey metal layers 14 and 18, while the second station 46 is used to deposit the transparent layers 16 and 20. Typically, the primer layer is formed during a pass that precedes forming the first layer pair 14 and 16. Moreover, using the apparatus shown in FIG. 3, each layer pair requires a different pass.

The control and monitoring of the sputtering apparatus 38 is accomplished using equipment and sensors that are standard in a coating machine of this type. A mass-flow controller (MKS) 80 is used for regulation of gas flow into the cathode stations 44 and 46. A reel motion controller 82 regulates the tension, speed and distance of the web material 12 as it moves through the apparatus 38. One or more AC or DC power supplies 84 provide power to the two sputtering cathodes of the stations 44 and 46. An optical monitoring system 86 is used to determine the optical characteristics of the web material over a spectral region of 400 nm to 2000 nm. The optical monitoring system is connected to the four monitors 70, 72, 74 and 76. A preglow power supply 88 controls the operation of the preglow station 78.

OVERVIEW OF AN EXAMPLE

A roll of a hardcoated PET substrate having a thickness of 7 mils was loaded into a sputtering apparatus 38 of the type described with reference to FIG. 3. The substrate was oriented so that the hardcoat layer 26 of FIG. 1 was facing the sputtering stations 44, 46 and 48. In an initial pass, the substrate was subjected to a preglow treatment and the primer layer 28 was applied. The pass was executed under the following conditions:

(1) GLOW CHAMBER 78
  Gas flow: $O_2$ 13.4 sccm
  Glow pressure: 16 milliTorr
  Glow voltage: 1500 volts
  Glow current draw: 100 ma
(2) STATION 46
  Line speed: 25 mm/sec
  Gas flow for Si deposition: Ar 103.4 sccm
  Target power: 900 watts
  Pressure: 3.0 milliTorr The target in the initial pass was a silicon target, so that a silicon primer layer was formed. Using the optical monitoring capability of the sputtering apparatus 38, it was determined that there was a 3% drop in transmissivity for the wavelength 400 nm (i.e., blue).

The initial pass is referred to as "Pass 0," since only the primer layer 28 is formed. In a "Pass 1," the first layer pair 14 and part of 16 (i.e., 77 nm) is formed. The physical thickness of the nichrome layer 14 is not controlled directly. Rather, the optical characteristics that are exhibited by the nichrome layer are of primary concern. To obtain the targeted visible light transmission for the coating described here, preferably the drop in Tvis as a result of the deposition of the layer pair is tuned to reach approximately 75.6%. The preferred Tvis range is from 75.1% to 76.1%. Conditions for achieving these results are as follows:

Glow voltage: 0 volts (i.e., off)
Targets: 1 NiCr target followed by 2 Si targets (i.e., AC pair)
Line speed: 9 mm/sec
Gas flow at the NiCr target: Ar 11.4 sccm
Pressure at the NiCr target: 3.03 milliTorr
Electrical conditions at the NiCr target: 390 watts, 1.01 A/430V
Gas flow at the Si cathodes: Ar 103.3 sccm; $O_2$ 49.3 sccm
Pressure at the Si cathodes: 3.25 milliTorr
Electrical properties at the Si cathodes: 5.0 kilowatts, 10.8 A/492V
Partial pressure of oxygen: 0.22 milliTorr.

As a result of this "Pass 1," the optical arrangement had a Tvis of approximately 75.6% and the thickness of the silicon dioxide layer was approximately 77.3 nm.

Figure 4:
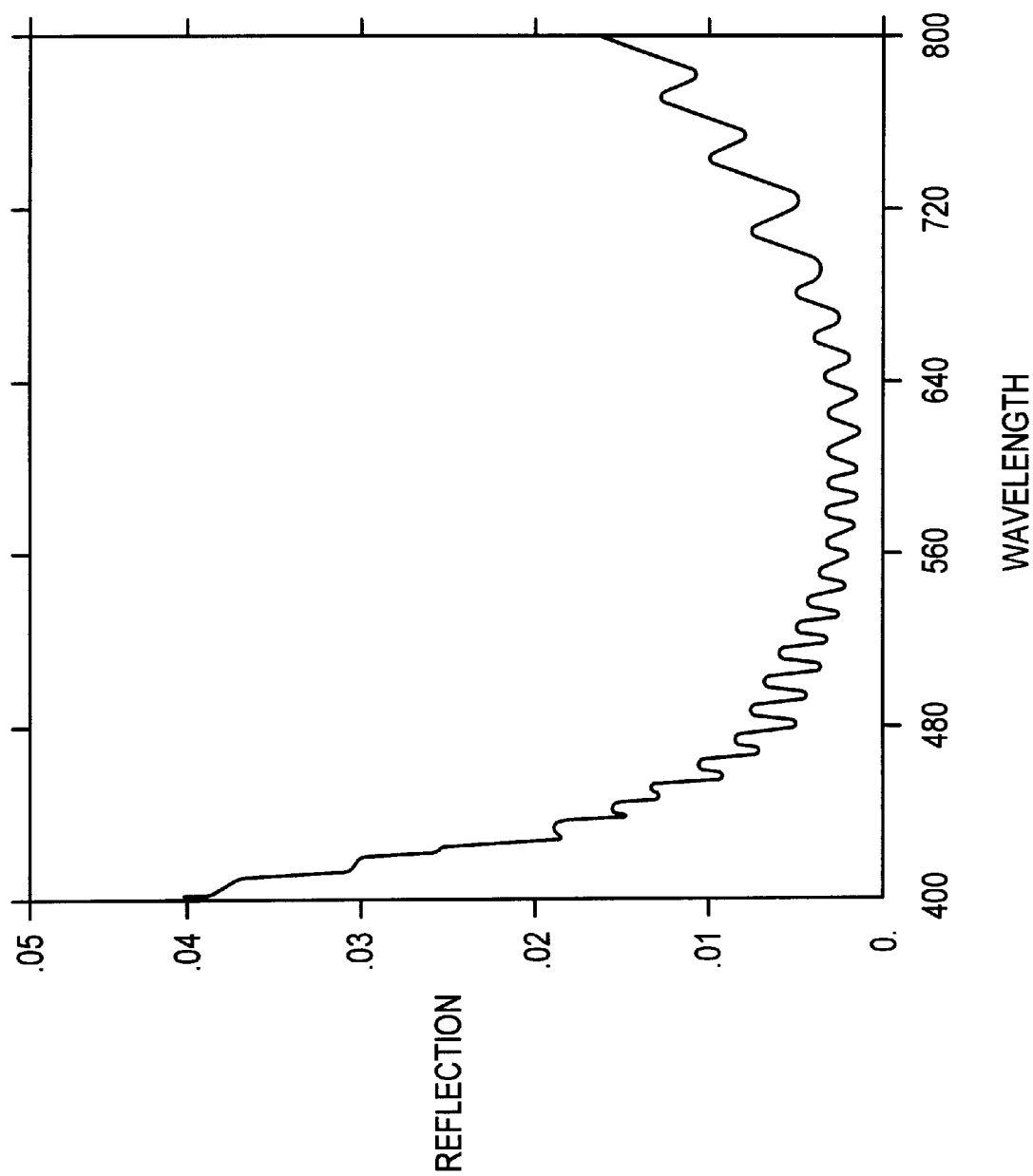
FIG. 4 is an illustration of the reflectivity of an experimentally fabricated optical arrangement according to the invention.

It was determined that the optical characteristics of the partially completed optical arrangement could be improved by increasing the thickness of the silicon dioxide layer at the top of the first layer pair of grey metal and silicon dioxide. The thickness was increased in other experiments. In one experiment, the thickness was increased to 110 nm. In a second experiment, the thickness was increased to approximately 120 nm. From this second experiment, another pass was executed in order to form the second layer pair of grey metal and silicon dioxide. Referring to FIG. 1, the grey metal layer 18 was formed to have a thickness of 6.7 nm and the silicon dioxide layer 20 was formed to have a thickness of 86 nm. The visible light transmission was measured to be 49%. The conditions for this pass were as follows:

Gas flow at the NiCr cathode: Ar 11.4 sccm
System at the NiCr cathode: 3.01 milliTorr
Electrical properties at the NiCr cathode: 750 watts, 15 A/463V
Gas flow at the Si cathodes: Ar 102.5 sccm; $O_2$ 53.9 sccm
Pressure at the Si cathode: 3.19 milliTorr Electrical properties at the Si cathode: 5.0 kilowatts, 12.5 A/439V FIG. 4 shows the properties of reflectivity at the visible wavelengths for the resulting optical arrangement. However, the optical properties of the invention can be easily tuned to meet required specifications.

What is claimed is:

1. A reflection control member comprising:

a substrate having a first surface;

a multi-layer antireflective coating on said substrate, said antireflective coating including:
 a first layer formed of a nickel chromium alloy, said first layer being adjacent to said first surface of said substrate;
 a second layer on said first layer, said second layer being a silicon oxide;
 a third layer on said second layer, said third layer being a nickel chromium layer; and
 a fourth layer on said third layer, said fourth layer being a silicon oxide; and a primer layer between said substrate and said antireflection coating to promote adhesion of said antireflection coating, said primer layer having a thickness of less than 50 angstroms and being formed of a material which is susceptible to at least partial oxidation when exposed to oxygen.

2. The reflection control member of claim 1 wherein said primer layer is deposited as silicon in an environment generally free of oxygen.

3. The reflection control member of claim 1 further comprising a hardcoat layer sandwiched between said substrate and said primer layer.

4. The reflection control member of claim 3 wherein said hardcoat layer is a siloxane-based material.

5. The reflection control member of claim 1 wherein said first layer has a thickness in the range of 0.5 nm to 30 nm and said third layer has a thickness that is selected to achieve a visible light transmissivity (Tvis) of said anti-reflective coating in the range of 20 percent to 80 percent.

6. The reflection control member of claim 1 wherein said first layer has a thickness in the range of 1 nm to 15 nm and said third layer has a thickness that is selected to achieve a Tvis of said antireflective coating in the range of 30 percent to 60 percent.

7. The reflection control member of claim 1 wherein said second and fourth layers are silicon dioxide, each having a thickness within the range of 50 nm to 200 nm.

8. A reflection control member comprising:

a transparent substrate;

a primer layer having a thickness of less than 50 angstroms, said primer layer being formed of a material selected to promote adhesion of a grey metal layer;

a first nickel chromium alloy layer formed on a side of said substrate in contact with said primer layer;

a first transparent silicon oxide layer in contact with said first nickel chromium alloy layer;

a second nickel chromium alloy layer in contact with said first transparent silicon oxide layer; and a second transparent silicon oxide layer in contact with said second nickel chromium alloy layer.

9. The reflection control member of claim 8 wherein said primer layer is formed of a silicon which is susceptible to oxidation following deposition.

10. The reflection control member of claim 9 further comprising a hardcoat layer between said primer layer and said substrate to enhance durability of said substrate.

11. The reflection control member of claim 8 wherein each said first and second nickel chromium alloy layer has a thickness in the range of 50 nm to 200 nm.

12. The reflection control member of claim 9 further comprising a lubricating layer formed on a side of said second transparent silicon oxide layer opposite to said substrate.

13. A method of fabricating a reflection control member comprising steps of:

providing a transparent substrate;

forming a primer layer on said substrate including depositing silicon in an environment that is generally free of oxidation;

forming a first nickel chromium layer on said primer layer;

forming a first transparent layer on said first nickel chromium layer;

forming a second nickel chromium layer on said first transparent layer; and forming a second transparent layer on said second nickel chromium layer, said reflection control member having a Tvis in the range of 20 percent to 80 percent.

14. The method of claim 13 wherein:

said step of forming said first nickel chromium layer includes sputter depositing material to a thickness in the range of 0.5 nm to 30 nm; and said step of forming said second nickel chromium layer includes sputter depositing material to a thickness selected to achieve a Tvis of said reflection control member in the range of 20 percent to 80 percent.

15. The method of claim 13 wherein said step of forming said primer layer further includes depositing said silicon to a thickness less than 50 angstroms.

16. A method of fabricating a reflection control member comprising steps of:

providing a transparent substrate;

forming a primer layer on said substrate;

sputter depositing a first nickel chromium layer on said primer layer to a thickness in the range of 0.5 nm to 30 nm;

forming a first transparent layer on said first nickel chromium layer to a thickness in the range of 50 nm to 200 nm;

sputter depositing a second nickel chromium layer on said first transparent layer to a thickness in the range of 0.5 nm to 30 nm; and forming a second transparent layer on said second nickel chromium layer to a thickness in the range of 50 nm to 200 nm, said step of sputter depositing said second nickel chromium layer including depositing material to a thickness selected such that said reflection control member has a Tvis in the range of 20 percent to 80 percent.

* * * * *